(12) United States Patent
Blanz et al.

(10) Patent No.: US 7,937,999 B2
(45) Date of Patent: May 10, 2011

(54) ESTIMATING FORMATION TEMPERATURE NEAR A BOREHOLE AND USING SAME FOR ESTIMATING A PROPERTY OF THE FORMATION

(75) Inventors: Martin Blanz, Celle (DE); Thomas Kruspe, Wietzendorf (DE)

(73) Assignee: Baker Hughes Incorporated, Houston, TX (US)

( * ) Notice: Subject to any disclaimer, the term of this patent is extended or adjusted under 35 U.S.C. 154(b) by 205 days.

(21) Appl. No.: 11/860,646

(22) Filed: Sep. 25, 2007

(65) Prior Publication Data

US 2008/0073122 A1    Mar. 27, 2008

Related U.S. Application Data

(60) Provisional application No. 60/847,230, filed on Sep. 26, 2006.

(51) Int. Cl.
   *E21B 47/06*    (2006.01)
   *G01V 9/00*    (2006.01)
(52) U.S. Cl. ............ 73/152.04; 73/152.12; 702/11
(58) Field of Classification Search .. 73/152.02–152.04, 73/152.12; 702/6.8, 129, 11
See application file for complete search history.

(56) References Cited

U.S. PATENT DOCUMENTS

| | | | |
|---|---|---|---|
| 3,327,527 A | | 6/1967 | Arps |
| 4,575,261 A | * | 3/1986 | Berger et al. ............ 374/136 |
| 4,765,183 A | * | 8/1988 | Coury .................. 73/152.03 |
| 4,881,406 A | * | 11/1989 | Coury .................. 73/152.03 |
| 5,159,569 A | | 10/1992 | Xu et al. |
| 6,789,937 B2 | * | 9/2004 | Haddad et al. ........... 374/136 |
| 6,905,241 B2 | * | 6/2005 | Zazovsky et al. ......... 374/134 |

FOREIGN PATENT DOCUMENTS

GB    2382601 A    6/2003

OTHER PUBLICATIONS

S.V. Kashikar et al., Determination of Formation Temperature From Flow Tests: A New Solution, Society of Petroleum Engineers, Production Operations Symposium, Apr. 1991, pp. 701-713.*
Brian Roux et al., An Improved Approach to Estimating True Reservoir Tempeature From Transient Temperature Data, Society of Petroleum Engineers California Regional Meeting, Apr. 1980, pp. 1-8.*
A.R. Hassan et al., Determination of Static Reservoir Temperature From Transient Data Following Mud Circualtion, Society of Petroleum Engineers Western Regional Meeting, Apr. 1992, pp. 565-574.*
H. S. Carslaw et al., *Conduction of Heat in Solids*, Second Edition, Oxford Science Publication, Chapter XIII, pp. 334-347.

* cited by examiner

*Primary Examiner* — John Fitzgerald
(74) *Attorney, Agent, or Firm* — Cantor Colburn LLP

(57) ABSTRACT

Apparatus, methods and computer programs disclosed herein, in one aspect, estimate a temperature of a selected region of an earth formation using a virgin formation temperature of the earth formation, a downhole fluid temperature measured over time, an elapsed time between drilling proximate the selected region and making of a formation evaluation measurement of the selected region, an estimate of thermal conductivity of the earth formation, and a heat capacity of the earth formation. In another aspect, the apparatus, methods and computer programs utilize the estimated temperature and the formation evaluation measurement to estimate a property of interest of the selected region. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims. 37 CFR 1.72(b).

19 Claims, 4 Drawing Sheets

US 7,937,999 B2

ESTIMATING FORMATION TEMPERATURE NEAR A BOREHOLE AND USING SAME FOR ESTIMATING A PROPERTY OF THE FORMATION

CROSS REFERENCE TO RELATED APPLICATIONS

This application takes priority from U.S. Provisional Application Ser. No. 60/847,230, filed Sep. 26, 2006, the contents of which are fully incorporated herein by reference.

TECHNICAL FIELD OF THE PRESENT DISCLOSURE

The present disclosure relates generally to apparatus and methods for estimating properties of interest of subsurface formations, including estimating properties using measurements of the formation that are sensitive to temperature of the formation.

BACKGROUND OF THE PRESENT DISCLOSURE

A variety of techniques are used to determine the presence and quantities of hydrocarbons (oil and gas) in earth formations. These methods are designed to determine formation parameters, including the resistivity, porosity, and permeability of the rock formation surrounding the wellbore drilled for recovering the hydrocarbons. Typically, the tools designed to provide the desired information are used to log the wellbore during drilling of the wellbore (referred to as measurement-while-drilling (MWD) or logging-while-drilling (LWD) or after drilling of the wellbore.

Certain formation evaluation (FE) measurements, such as Nuclear Magnetic Resonance (NMR) measurements and Neutron Density measurements, are sensitive to the actual formation temperature of the formation region of the measurements made by such tools. For example, signal amplitude of nuclear magnetic resonance (NMR) measurements for determining total porosity are inversely proportional to the temperature of the earth formation from which the NMR signals originate. For example if the absolute temperature $\Theta$ of the measurement region (also referred to as the "selected region," sensitive region" or "sensitive volume") of an NMR tool is $\Theta_{formation}=350K(77°\ C.)$ and the drilling fluid or "mud" temperature is $\Theta_{mud}=330K(57°\ C.)$, the error introduced in NMR data by using the mud temperature instead of the formation temperature will be about $$\left(1 - \frac{\Theta_{mud}}{\Theta_{formation}}\right) = \left(1 - \frac{330\,K}{350\,K}\right) \approx 6\%.$$

The actual formation temperature $\Theta_{formation}$ in the sensitive volume of the downhole NMR tool may not generally be the "virgin" formation temperature $\Theta_{formation}^{virgin}$ because the drilling fluid or "mud" penetrates into the formation surrounding the wellbore and thus the sensitive region. The change in the formation temperature is a function of the mud temperature $\Theta_{mud}(t)$ and the time elapsed between the time of drilling past the sensitive region and the time measurements are made. The elapsed time is a function of the drilling rate (rate of penetration (ROP) of the drill bit into the formation) and the offset between the drill bit and the sensors making the measurements.

Therefore, there is a need for estimating or determining the actual temperature of the sensitive region at the time the formation evaluation measurements are made. The disclosure herein provides apparatus, methods and computer programs for estimating the actual temperature of the sensitive region and using the estimated actual temperature to estimate or compute one or more properties of interest of the formation.

SUMMARY OF THE PRESENT DISCLOSURE

The disclosure provides a method that in one aspect comprises: estimating a time difference ("elapsed time") between the time a borehole is drilled proximate a selected region of a formation and a time at which a measurement of a property of interest of the selected region is made; estimating a temperature of a fluid in the borehole over time proximate the selected region; estimating a virgin formation temperature of the selected region; and estimating an actual temperature of the selected region using the estimated elapsed time, temperature of the fluid over time, a virgin formation temperature, a thermal conductivity of the earth formation, and a heat capacity of the earth formation. In another aspect, the method includes estimating the property of interest using the estimated actual temperature and the measurement of the selected region.

In another aspect, an apparatus is provides that may include: a sensor configured to provide a measurement relating to a property of interest of a selected region proximate a borehole drilled through a formation; a processor configured to estimate an actual formation temperature using: a virgin formation temperature of the earth formation; a temperature of a fluid in the borehole measured over time proximate the selected region; a time difference between a time the borehole is drilled proximate the selected region and a time at which the sensor makes the measurement relating to the property of interest; a thermal conductivity of the earth formation; and a heat capacity of the earth formation. In another aspect, the processor may further be configured to compute the property of interest of the selected region using the computed actual temperature of the selected region and the measurement made relating to the property of interest.

In another aspect, a computer program is embedded in a computer readable medium that is accessible to the processor, which computer program includes: instructions to compute a time difference ("elapsed time") between a time a borehole is drilled proximate a selected region and a time at which a measurement relating to a property interest of the selected region is made; instructions to compute temperature of a fluid using temperature measurements made in the borehole over time; and instructions to compute an actual temperature of the selected region using the computed elapsed time and computed fluid temperature over time and a value of thermal conductivity of the formation, a value of heat capacity of the formation and a value of virgin temperature of the selected region. The computer program may further include instructions to estimate or compute the property of interest of the selected region using the computed actual temperature of the selected region and the measurement made relating to the property of interest.

Examples of the certain features of the apparatus, methods and computer programs for estimating an actual temperature of a selected region of an earth formation been summarized rather broadly in order that the detailed description thereof that follows may be better understood. There are, of course, many additional features described hereinafter and which will form the subject of the claims appended hereto. An abstract is provided herein to satisfy certain regulatory requirements. The summary and the abstract are not intended to limit the scope of the disclosure or any claim in this application or an application that may take priority from this application.

BRIEF DESCRIPTION OF THE DRAWINGS

The following figures form part of the present specification and are included to further demonstrate certain aspects of the present disclosure and should not be used to limit the present disclosure or the claims. The present disclosure may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, wherein:

It is to be noted, however, that the appended drawings illustrate only typical embodiments of the present disclosure and are, therefore, not to be considered limiting of the scope of the present disclosure, as the present disclosure may admit to other equally effective embodiments.

DETAILED DESCRIPTION OF ILLUSTRATIVE EMBODIMENTS

Illustrative embodiments of the present disclosure are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

Figure 1:
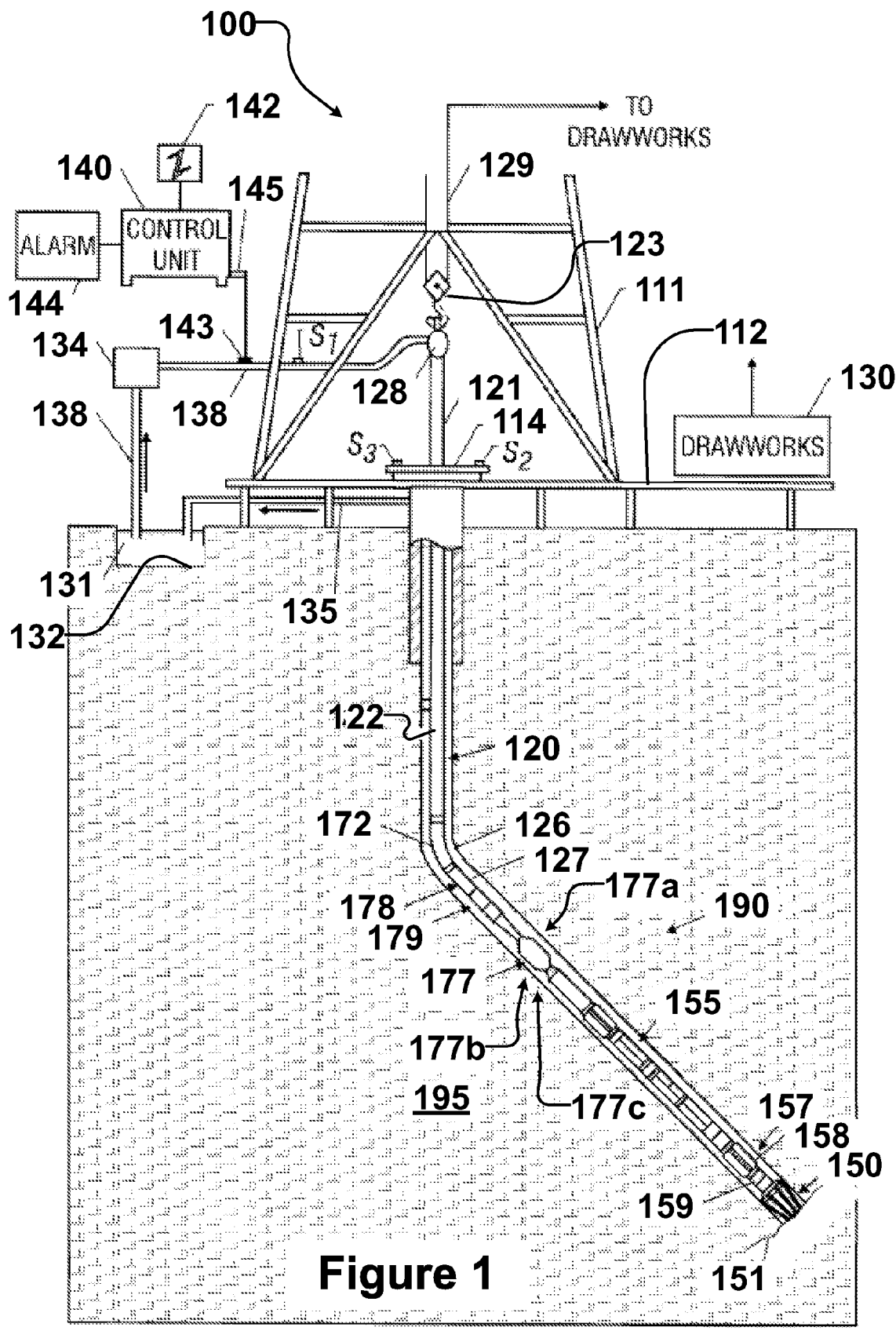
FIG. 1 schematically illustrates a drilling system having a drillstring conveying a drilling assembly into a wellbore for drilling the wellbore.

FIG. 1 shows a schematic diagram of drilling system 100 that in one aspect may be configured to estimate an actual temperature of a sensitive or selected region of a formation and in another aspect may be configured to utilize the estimated actual temperature to estimate a property of interest of the selected region. The drilling system 100 has a drillstring 120 carrying a drilling assembly 190 (also referred to as a "bottom hole assembly" or "BHA") conveyed in a "wellbore" or "borehole" 126 for drilling the wellbore 126 into geological formations 195. The drilling system 100 may include a conventional derrick 111 erected on a floor 112 that may support a rotary table 114 that may be rotated by a prime mover such as an electric motor (not shown) at a desired rotational speed. The drillstring 120 may include tubing such as a drill pipe 122 or a coiled-tubing extending downward from the surface into the borehole 126. The drillstring 120 may be pushed into the wellbore 126 when the drill pipe 122 is used as the tubing. For coiled-tubing applications, a tubing injector (not shown) may be used to move the coiled-tubing from a source thereof, such as a reel (not shown), to the wellbore 126. A drill bit 150 attached to the end of the drillstring 120 breaks up the geological formations 195 when the drill bit 150 is rotated. If the drill pipe 122 is used, the drillstring 120 may be coupled to a drawworks 130 via a Kelly joint 121, a swivel 128, and a line 129 through a pulley 123. During drilling operations, the drawworks 130 may be operated to control the weight on the drill bit 150 or the "weight on bit," which is an important parameter that affects the rate of penetration (ROP) into the geological formations 195. The operation of the drawworks 130 is well known in the art and is thus not described in detail herein.

During typical drilling operations, a suitable drilling fluid 131 (also referred to sometimes as "mud" or "drilling mud") from a mud pit (source) 132 may be circulated under pressure through a channel in the drillstring 120 by a mud pump 134. The drilling fluid 131 may pass from the mud pump 134 into the drillstring 120 via a desurger (not shown), a fluid line 138, and the Kelly joint 121. The drilling fluid 131 is generally discharged downhole at a borehole bottom 151 through an opening (not shown) in the drill bit 150 and circulates uphole through an annular space 127 between the drillstring 120 and the borehole 126, returning to the mud pit 132 via a return line 135. The drilling fluid 131 lubricates the drill bit 150 and carries borehole 126 cuttings and/or chips away from the drill bit 150. A flow rate sensor or dynamic pressure sensor $S_1$ is typically placed in the fluid line 138 and may provide information about the drilling fluid 131 flow rate and/or dynamic pressure. A surface torque sensor $S_2$ and a surface rotational speed sensor $S_3$ associated with the drillstring 120 may provide information about the torque and the rotational speed of the drillstring 120, respectively. Additional sensors (not shown) may be associated with the line 129 to provide the hook load of the drillstring 120.

In one aspect, the drill bit 150 may be rotated by only rotating the drill pipe 122. In another aspect, a downhole motor 155 (mud motor) may be disposed in the BHA 190 to rotate the drill bit 150. The drill pipe 122 may be rotated to supplement the rotational power of the mud motor 155 or to effect changes in the drilling direction. The mud motor 155 may be coupled to the drill bit 150 via a drive shaft (not shown) disposed in a bearing assembly 157. The mud motor 155 may rotate the drill bit 150 when the drilling fluid 131 passes through the mud motor 155 under pressure. The bearing assembly 157 may support the radial and/or the axial forces of the drill bit 150. A stabilizer 158 coupled to the bearing assembly 157 may act as a centralizer for the lowermost portion of the mud motor 155 and/or the BHA 190.

In one aspect, a drilling sensor module 159 placed near the drill bit 150 may contain sensors, circuitry, and/or processing software to determine dynamic drilling parameters, such as bit bounce of the drill bit 150, stick-slip of the BHA 190, backward rotation, torque, shocks, borehole pressure, annulus pressure, acceleration measurements, etc. A suitable telemetry and/or communication sub 172 may also be provided to communicate data to and from the surface. The drilling sensor module 159 may process the raw sensor information and/or may transmit the sensor information to a surface control 140 via the telemetry system 172 or a transducer 143 coupled to the fluid line 138, as shown at 145.

The communication sub 172, the power unit 178, and a formation evaluation (FE) tool 179 may all be connected in tandem with the drillstring 120. Flex subs, for example, may be used in connecting the FE tool 179 to the BHA 190. The BHA 190 may perform various measurements, such as pulsed nuclear magnetic resonance (NMR) measurements and/or nuclear density (ND) measurements, for example, while the borehole 126 is being drilled. The BHA 190 may include one or more formation evaluation and/or other tools and/or sensors 177, such as a temperature sensor 177a, capable of making measurements of the downhole mud (drilling fluid) 131 temperature over time and arranged so to do, and/or a mud (drilling fluid) 131 dynamic pressure and/or flow rate sensor 177b, capable of making measurements of the downhole mud (drilling fluid) 131 dynamic pressure and/or flow rate. The communication sub 172 typically obtains the measurements and transfers the signals, to be processed at the surface. Alternatively, the signals may be processed downhole, using a downhole processor 177c in BHA. The communication between the surface and the downhole devices may be established using any suitable telemetry technique, including, but not limited to, mud pulse telemetry, electromagnetic telemetry, acoustic telemetry, and wired pipe. The wired pipe may be: a coiled tubing, in which the tubing caries a communication link; or a jointed tubulars, wherein the individual tubulars carry a communication link, such as an electrical conductor or an optical fiber.

The surface control unit 140 receives and processes signals from one or more other downhole sensors as well as the flow rate sensor $S_1$, the surface torque sensor $S_2$, and/or the surface rotational speed sensor $S_3$ and other sensors used in the drilling system 100. The surface control unit 140 may display desired drilling parameters on a display 142 that may be utilized by an operator to control the drilling operations. The surface control unit 140 may typically include a computer or processor, at least one memory for storing programs and data, and a recorder for recording data. The surface control unit 140 may typically be configured to activate one or more alarms 144 under certain operating conditions.

Figure 2:
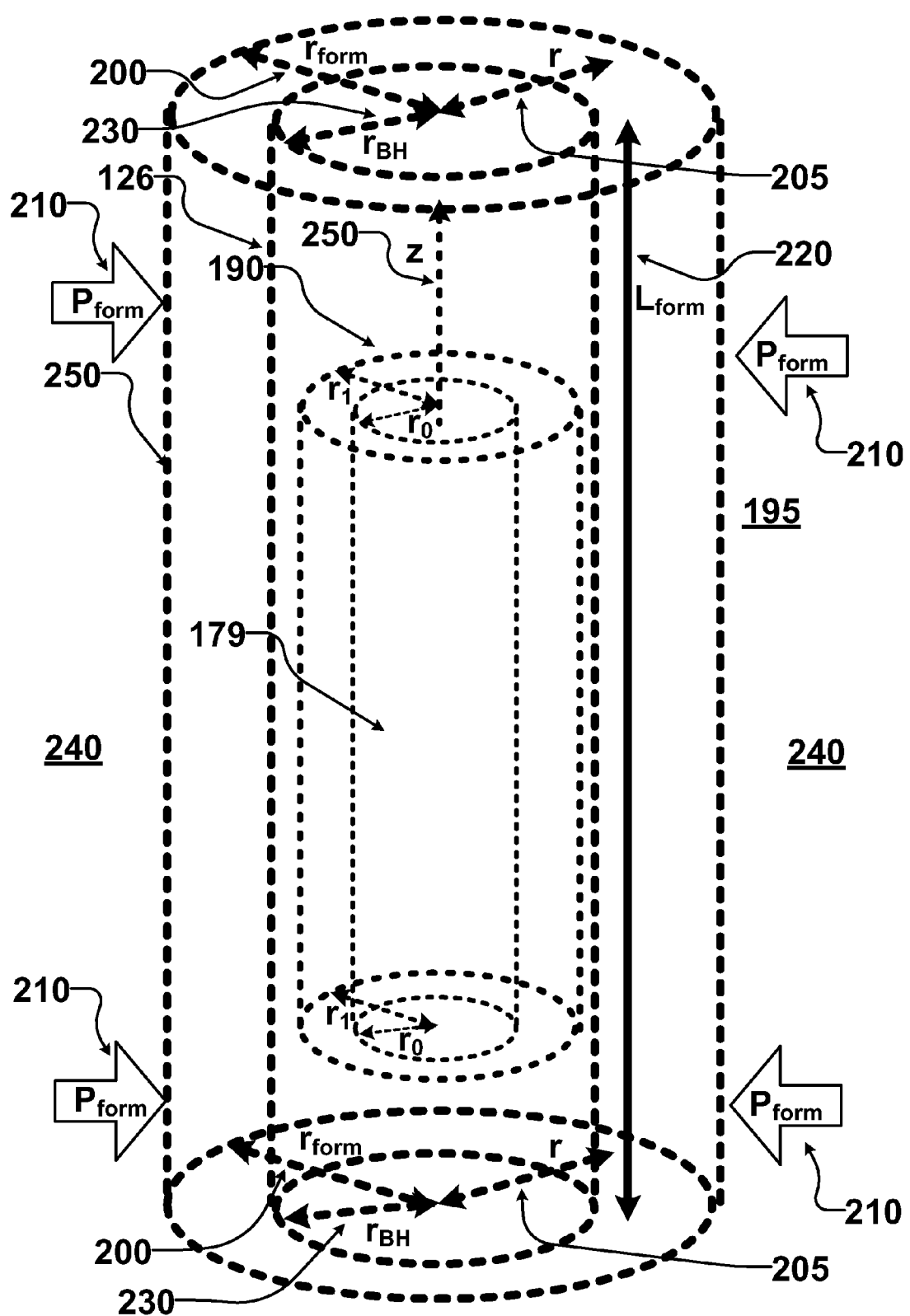
FIG. 2 schematically illustrates region of an earth formation surrounding a borehole penetrating the earth formation.

Referring to FIG. 2, the formation temperature $\Theta_{formation}$ in a sensitive volume or region 240 of the downhole FE tool 179 of the BHA 190 is obtained. The formation temperature $\Theta_{formation}$ in the sensitive region 240 of the downhole formation evaluation tool 179 (the "selected region") may not generally be the "virgin" formation temperature $\Theta_{formation}^{virgin}$ because the temperature of the earth formation 195 in the neighborhood of the borehole 126 is often affected by the drilling mud 131. Also, the formation temperature $\Theta_{formation}$ is generally not constant over time. Before the earth formation 195 has been drilled into, the formation temperature is the "virgin" formation temperature $\Theta_{formation} = \Theta_{formation}^{virgin}$. However, once a borehole has penetrated the earth formation 195, the drilling mud 131 generally cools the earth formation 195 near the borehole 126. The mud temperature $\Theta_{mud}(t)$ may be time-dependent and may be measured downhole by one or more of the downhole FE tools 179.

The time elapsed $t_{elapsed}$ elapsed between drilling into the earth formation 195 and measuring the earth formation 195 may generally be measured uphole and/or downhole. The time elapsed $t_{elapsed}$ may depend on the rate of penetration (ROP) into the earth formation 195 and/or the offset $L_{offset}$ between the drill bit 150 and the downhole MWD FE tool 179. Typically, the time elapsed $t_{elapsed}$ between drilling into the earth formation 195 and measuring the earth formation 195 may be about an hour during drilling.

Estimating an actual formation temperature $\Theta_{formation}^{estimated}$ of the selected region may include using one or more of a set of parameters, including (1) the virgin formation temperature $\Theta_{formation}^{virgin}$ of the earth formation 195, (2) the downhole mud temperature $\Theta_{mud}(t)$ over time, (3) the time elapsed $t_{elapsed}$ between drilling a borehole into the earth formation 195 and making the formation evaluation (FE) measurement in the selected region, (4) a thermal conductivity $\lambda_{earth}$ of the earth formation 195, and (5) at least one of (i)a volumetric heat capacity $c_{earth}^V$ of the earth formation 195, and (ii) a specific heat capacity $c_{earth}$ of the earth formation 195 together with a density $\rho_{earth}$ of the earth formation 195. Estimating the formation temperature $\Theta_{formation}^{estimated}$ of the earth formation 195 may include using one or more of the set of the above-mentioned parameters (1)-(5) in at least one partial differential equation, at least one of whose solutions gives the estimated formation temperature $\Theta_{formation}^{estimated}(r,t)$ of the selected region, dependent on a radial distance r into the earth formation 195, as indicated at 205 in FIG. 2, from the center of the borehole 126 and time t.

The thermal conductivity $\lambda_{earth}$ of the earth formation 195, the volumetric heat capacity $c_{earth}^V$ of the earth formation 195 and/or the specific heat capacity $c_{earth}$ and the density $\rho_{earth}$ of the earth formation 195, may be determined from various methods. For example, the lithology of the earth formation 195 may be determined from one or more downhole FE sensors and/or MWD FE tools 179 included as part of the BHA 190. Based on known lithology, a table lookup may be used to determine the approximate thermal conductivity $\lambda_{earth}$ of the earth formation 195, the volumetric heat capacity $c_{earth}^V$ of the earth formation 195 and/or the specific heat capacity $c_{earth}$ and the density $\rho_{earth}$ of the earth formation 195.

Determining the virgin formation temperature of the earth formation 195 may further include logging at least one nearby well by wireline. Determining the virgin formation temperature $\Theta_{formation}^{virgin}$ of the earth formation 195 may further include measuring the downhole mud temperature $\Theta_{mud}(t_0)$ to obtain a virgin formation temperature at a first depth $\Theta_{formation}^{virgin}(z_1)$ so that $\Theta_{mud}(t_0)=\Theta_{formation}^{virgin}(z_1)$ while the mud pump(s) 134 are off for at least an appropriate first predetermined period of time and measuring the downhole mud temperature $\Theta_{mud}(t_0)$ substantially immediately after resuming pumping if the mud pump(s) 134 have been off for at least an appropriate second predetermined period of time T. The virgin formation temperature of the earth formation may be estimated at a second depth $\Theta_{formation}^{virgin}(z_2)$ from the virgin formation temperature fix at the first depth $\Theta_{formation}^{virgin}(z_1)$ and a geological temperature gradient $$\frac{d\Theta_{formation}^{virgin}(z)}{dz}$$

of the earth formation 195. As one of ordinary skill in the art would appreciate, the borehole depth is substantially identical with the true vertical depth (TVD) when the borehole is substantially vertical. The geological temperature gradient, however, is normally known with respect to the TVD. Consequently, calculating an axial geological temperature gradient with respect to the borehole axis depth takes into account an inclination of the borehole with respect to the true vertical. This calculated axial geological temperature gradient may then be used to calculate the virgin formation temperature in the selected region. For the sake of ease of presentation, the variable z represents the true vertical direction, but more generally, and as used herein, may be taken to be the axial direction along the borehole, which may or may not be inclined with respect to the true vertical direction. The virgin formation temperature of the earth formation at the second depth may be estimated by using a Taylor series expansion and keeping only the leading terms:

$$\Theta_{formation}^{virgin}(z_2) \approx \Theta_{formation}^{virgin}(z_1) + (z_2 - z_1) \frac{d\Theta_{formation}^{virgin}(z)}{dz}\bigg|_{z=z_1} \quad \text{Eq. (1)}$$

Typically, the time $t_0$ substantially immediately after starting pumping mud using one or more mud pump(s) 134 after a predetermined off-time of time T lies in a range of 0 seconds to about 60 seconds. Similarly, the minimum second predetermined period of time T, during which the one or more mud pump(s) 134 had been off, may be about a day or so.

In one aspect, determining the virgin formation temperature $\Theta_{formation}^{virgin}$ of the earth formation 195 may further include measuring the downhole mud temperature $\Theta_{mud}(t_{trip})$ to obtain a virgin formation temperature at a first depth $\Theta_{formation}^{virgin}(z_1) = \Theta_{mud}(t_{trip})$ during tripping, and estimating the virgin formation temperature of the earth formation at a second depth $\Theta_{formation}^{virgin}(z_2)$ from the virgin formation temperature at the first depth $\Theta_{formation}^{virgin}(z_1) = \Theta_{mud}(t_{trip})$. Estimation may be made using either several temperature measurements taken along the length of the borehole while tripping to determine an estimate of the temperature gradient or using a previously determined or known geological temperature gradient $$\frac{d\Theta_{formation}^{virgin}(z)}{dz}$$

of the earth formation 195. The virgin formation temperature of the earth formation at the second depth may be estimated from Eq. (1).

The geological temperature gradient(s)

$$\frac{d\Theta_{formation}^{virgin}(z)}{dz}$$

and/or $$\frac{d\Theta_{formation}^{virgin}(z)}{dz}$$

of the earth formation 195 may be known. The downhole formation evaluation (FE) tool 179 may be able to measure and/or otherwise determine the approximate geological temperature gradient(s)

$$\frac{d\Theta_{formation}^{virgin}(z)}{dz}$$

and/or $$\frac{d\Theta_{formation}^{virgin}(z)}{dz}$$

of the earth formation 195. Alternatively, the relevant temperature gradient(s) may be approximately known by logging at least one nearby well by wireline.

A formation temperature transient near the borehole 126 may be calculated as follows. As described above, calculating the estimated formation temperature $\Theta_{formation}^{estimated}$ of the selected region may include using one or more of the set of the parameters including (1) the virgin formation temperature $\Theta_{formation}^{virgin}$ of the earth formation 195, (2) the downhole mud temperature $\Theta_{mud}(t)$ over time, (3) the time elapsed $t_{elapsed}$ between drilling into the earth formation 195 and making the formation evaluation (FE) measurement of the earth formation 195 with the downhole formation evaluation (FE) tool 179, (4) the thermal conductivity $\lambda_{earth}$ of the earth formation 195, and (5) at least one of: (i) the volumetric heat capacity $c_{earth}^V$ of the earth formation 195, and (ii) the specific heat capacity (mass-based) $c_{earth}$ together with the density $\rho_{earth}$ of the earth formation 195. In one aspect, calculating the formation temperature $\Theta_{formation}^{estimated}$ in the sensitive region 240 may include using one or more of the above-mentioned set of the parameters (1)-(5) in at least one partial differential equation, at least one of whose solutions gives a formation temperature $\Theta^{formationestimated}(r,t)$ of the earth formation 195 in the sensitive region 240 of the downhole FE tool 179, dependent on a radial distance r into the earth formation 195 from the center of the borehole 126 as indicated at 205 in FIG. 2, and time t.

In one aspect, a one-dimensional (radial) heat conduction equation may be used, modified for cylindrical geometry by introducing a radially dependent area through which heat flows, substantially independent of the axial direction (substantially z-independent). For an earth formation of weak sandstone the specific heat capacity is typically about $$c_{earth} = 800 \frac{J}{\text{kg}K},$$

the density typically about $$\rho_{earth} = 2300 \frac{\text{kg}}{\text{m}^3},$$

and the thermal conductivity $\lambda_{earth}$ is typically about 1.5 (W/m)/K. The heat flow (power) through a cylinder shell $A(r) = 2\pi r L_{form}$ of the earth formation 195, having a length $L_{form}$ and a radius r, as shown at 220 in FIG. 2, may be about $$P_{form}(r, t) = -\lambda_{form} A(r) \left( \frac{\partial}{\partial r} \Theta_{formation}^{nearBH}(r, t) \right) \quad \text{Eq. (2)}$$

at the radial distance r from the center of the borehole 126 at the time t. The change of the power between the radial distance r and the radial distance $r+\Delta r$ is the difference of heat flow in and out of the volume, where $\Delta r$ is an incremental increase in the radial distance r. This leads to the equation $$P_{form}(r, t) - P_{form}(r + \Delta r, t) = \quad \text{Eq. (3)}$$
$$c_{earth} \rho_{earth} A(r) \Delta r \left( \frac{\partial}{\partial t} \Theta_{formation}^{nearBH}(r, t) \right)$$

which becomes, on dividing through by $\Delta r$ and taking the limit as $\Delta r \to 0$, $$\lim_{\Delta r \to 0} \frac{P_{form}(r, t) - P_{form}(r + \Delta r, t)}{\Delta r} = \quad \text{Eq. (4)}$$
$$-\left( \frac{\partial}{\partial r} P_{form}(r, t) \right) = c_{earth} \rho_{earth} A(r) \left( \frac{\partial}{\partial t} \Theta_{formation}^{nearBH}(r, t) \right).$$

Inserting the Eq. (2) into Eq. (4) gives $$\left(\frac{\partial}{\partial r}\left[\lambda_{form}A(r)\left(\frac{\partial}{\partial r}\Theta_{formation}^{nearBH}(r,t)\right)\right]\right) = \quad \text{Eq. (5)}$$
$$c_{earth}\rho_{earth}A(r)\left(\frac{\partial}{\partial t}\Theta_{formation}^{nearBH}(r,t)\right).$$

For clarity and ease of understanding, it is noted that if the area $A(r)=2\pi r L_{form}$ was independent of the radial distance r, then the partial differential equation (Eq. (5)) would result in:

$$\frac{\partial}{\partial t}\Theta_{formation}^{nearBH}(r,t) = \frac{\lambda_{formation}}{c_{earth}\rho_{earth}}\frac{\partial^2}{\partial r^2}\Theta_{formation}^{nearBH}(r,t), \quad \text{Eq. (6)}$$

which equation, as known in the art, is a one dimensional partial differential equation of heat conduction.

Inserting the equation for the area $A(r)=2\pi r L_{form}$ into the partial differential equation for two-dimensional cylindrical heat conduction gives $$\frac{\partial}{\partial r}\left[\lambda_{form}r\left(\frac{\partial}{\partial r}\Theta_{formation}^{nearBH}(r,t)\right)\right] = c_{earth}\rho_{earth}r\left(\frac{\partial}{\partial t}\Theta_{formation}^{nearBH}(r,t)\right), \quad \text{Eq. (7)}$$

which may be rearranged to obtain $$\frac{\partial}{\partial t}\Theta_{formation}^{nearBH}(r,t) = \frac{\lambda_{form}}{c_{earth}\rho_{earth}}\frac{1}{r}\frac{\partial}{\partial r}\left[r\left(\frac{\partial}{\partial r}\Theta_{formation}^{nearBH}(r,t)\right)\right], \quad \text{Eq. (8)}$$

which is $$\frac{\partial}{\partial t}\Theta_{formation}^{nearBH}(r,t) = \quad \text{Eq. (9)}$$
$$\frac{\lambda_{form}}{c_{earth}\rho_{earth}}\frac{1}{r}\left(\left(\frac{\partial r}{\partial r}\right)\left(\frac{\partial}{\partial r}\Theta_{formation}^{nearBH}(r,t)\right) + r\frac{\partial^2}{\partial r^2}\Theta_{formation}^{nearBH}(r,t)\right)$$

which is $$\frac{\partial}{\partial t}\Theta_{formation}^{nearBH}(r,t) = \quad \text{Eq. (10)}$$
$$\frac{\lambda_{form}}{c_{earth}\rho_{earth}}\frac{1}{r}\left(\left(\frac{\partial}{\partial r}\Theta_{formation}^{nearBH}(r,t)\right) + r\frac{\partial^2}{\partial r^2}\Theta_{formation}^{nearBH}(r,t)\right)$$

which is $$\frac{\partial}{\partial t}\Theta_{formation}^{nearBH}(r,t) = \quad \text{Eq. (11)}$$
$$\frac{\lambda_{form}}{c_{earth}\rho_{earth}}\left(\frac{1}{r}\frac{\partial}{\partial r}\Theta_{formation}^{nearBH}(r,t) + \frac{\partial^2}{\partial r^2}\Theta_{formation}^{nearBH}(r,t)\right)$$

Eq. (11) may also be derived by using the three-dimensional partial differential equation for heat conduction $$\frac{\partial}{\partial t}\Theta_{formation}^{nearBH}(r,t) = \frac{\lambda_{form}}{c_{earth}\rho_{earth}}\nabla^2 \Theta_{formation}^{nearBH}(r,t)$$

using the Laplacian operator appropriate for cylindrical geometry (with the azimuthal angle $\phi$)

$$\nabla^2 \Theta_{formation}^{nearBH}(r,t) = \left[\frac{1}{r}\frac{\partial}{\partial r}\left(r\frac{\partial}{\partial r}\right) + \frac{1}{r}\frac{\partial^2}{\partial \varphi^2} + \frac{\partial^2}{\partial z^2}\right]\Theta_{formation}^{nearBH}(r,t) \quad \text{Eq. (12)}$$

or $$\nabla^2 \Theta_{formation}^{nearBH}(r,t) = \frac{1}{r}\frac{\partial}{\partial r}\left(r\frac{\partial}{\partial r}\Theta_{formation}^{nearBH}(r,t)\right), \quad \text{Eq. (13)}$$

since $\Theta_{formation}^{near\,BH}(r,t)$ is substantially independent of the azimuthal angle $\phi$ and the axial coordinate z.

In one aspect, various two-dimensional (radial and axial and/or radial and azimuthal) heat conduction equations may be used, each with an appropriate two-dimensional (such as radial and axial and/or radial and azimuthal) cylindrical geometry. For example, in an axially anisotropic earth formation 195 that has radial lamination that is substantially orthogonal to the axial coordinate z along the axis 250 of the borehole 126 and is substantially independent of the azimuthal angle $\phi$, the three-dimensional partial differential equation for heat conduction $$\frac{\partial}{\partial t}\Theta_{formation}^{nearBH}(r,z,t) = \frac{\lambda_{form}}{c_{earth}\rho_{earth}}\nabla^2\Theta_{formation}^{nearBH}(r,z,t) \quad \text{Eq. (14)}$$

becomes $$\nabla^2 \Theta_{formation}^{nearBH}(r,z,t) = \left[\frac{1}{r}\frac{\partial}{\partial r}\left(r\frac{\partial}{\partial r}\right) + \frac{\partial^2}{\partial z^2}\right]\Theta_{formation}^{nearBH}(r,z,t), \quad \text{Eq. (15)}$$

using cylindrical coordinates and assuming $\Theta_{formation}^{near\,BH}(r,z,t)$ to be substantially independent of the azimuthal angle $\phi$. Similarly, in a radially anisotropic earth formation 195 that is not substantially independent of the azimuthal angle $\phi$, but that is substantially independent of the axial direction (substantially z-independent), the three-dimensional partial differential equation for heat conduction $$\frac{\partial}{\partial t}\Theta_{formation}^{nearBH}(r,\varphi,t) = \frac{\lambda_{form}}{c_{earth}\rho_{earth}}\nabla^2\frac{\partial}{\partial t}\Theta_{formation}^{nearBH}(r,\varphi,t) \quad \text{Eq. (16)}$$

becomes $$\nabla^2 \frac{\partial}{\partial t}\Theta_{formation}^{nearBH}(r,\varphi,t) = \quad \text{Eq. (17)}$$
$$\left[\frac{1}{r}\frac{\partial}{\partial r}\left(r\frac{\partial}{\partial r}\right) + \frac{1}{r}\frac{\partial^2}{\partial \varphi^2}\right]\frac{\partial}{\partial t}\Theta_{formation}^{nearBH}(r,\varphi,t),$$

using cylindrical coordinates and assuming $\Theta_{formation}^{near\,BH}(r,\phi,t)$ to be substantially independent of the axial coordinate z.

In one aspect, a fully three-dimensional (radial, azimuthal, and axial) heat conduction equation may be used, with an appropriate three-dimensional (radial, azimuthal, and axial) cylindrical geometry. In an axially and radially anisotropic earth formation 195 that has substantially radial lamination that is not substantially independent of either the azimuthal angle $\phi$ or the axial direction, the three-dimensional partial differential equation for heat conduction $$\frac{\partial}{\partial t}\frac{\partial}{\partial t}\Theta_{formation}^{nearBH}(r,\varphi,z,t) = \frac{\lambda_{form}}{c_{earth}\rho_{earth}}\nabla^2\Theta_{formation}^{nearBH}(r,\varphi,z,t) \quad \text{Eq. (18)}$$

becomes

-continued $$\nabla^2 \Theta_{formation}^{nearBH}(r, \varphi, z, t) = \left[\frac{1}{r}\frac{\partial}{\partial r}\left(r\frac{\partial}{\partial r}\right) + \frac{1}{r}\frac{\partial^2}{\partial \varphi^2} + \frac{\partial^2}{\partial z^2}\right]\Theta_{formation}^{nearBH}(r, \varphi, z, t), \quad \text{Eq. (19)}$$

in cylindrical coordinates.

In one aspect, the partial differential equation for heat conduction (Eq. (11)) may be solved numerically, for example, using a partial differential equation (PDE) solver, such as PDE solver from Mathcad®. Note that a constant value $\Theta_{formation}^{nearBH}(r=r_{form}, t=0) \equiv \Theta_1^{BH}$ that is independent of the radius r and the time t may freely be subtracted from for $\Theta_{formation}^{nearBH}(r,t)$ giving a new quantity (the temperature difference $\delta\Theta_{formation}^{nearBH}(r, t) \equiv \Theta_{formation}^{nearBH}(r,t) - \Theta_1^{BH}$ at the time t between the temperature at the radius r and the temperature at the inside of the earth formation 195) that may satisfy the same partial differential equation (PDE) for heat conduction $$\frac{\partial}{\partial t}\delta\Theta_{formation}^{nearBH}(r, t) = \frac{\lambda_{form}}{c_{earth}\rho_{earth}}\left(\frac{1}{r}\frac{\partial}{\partial r}\delta\Theta_{formation}^{nearBH}(r, t) + \frac{\partial^2}{\partial r^2}\delta\Theta_{formation}^{nearBH}(r, t)\right). \quad \text{Eq. (20)}$$

For a temperature $\Theta_{mud}(r_{BH})$ of the drilling mud 131 about 10.0 K cooler than the virgin temperature $\Theta_{formation}^{virgin}(r_{form})$ of the earth formation 195, Eq. (20) may be written as $$T_t(r, t) = \frac{\lambda_{form}}{c_{earth}\rho_{earth}}\left(\frac{1}{r}T_r(r, t) + T_{rr}(r, t)\right), \quad \text{Eq. (21)}$$

where $$\frac{\partial}{\partial t}\delta\Theta_{formation}^{nearBH}(r, t)$$

is written as $$T_t(r, t), \frac{\partial}{\partial r}\delta\Theta_{formation}^{nearBH}(r, t)$$

is written as $$T_r(r, t), \text{ and } \frac{\partial^2}{\partial r^2}\delta\Theta_{formation}^{nearBH}(r, t)$$

is written as $T_{rr}(r,t)$. Eq. (21) may be solved by imposing the start condition T(r,0)=0.0K and the Dirichlet boundary conditions for both ends $T(r=r_{BH}=0.108$ m,t)=−10.0K and $T(r=r_{form}=1.0$ m,t)=0.0K of the evaluation range for T (r,t). The outer radius, here $r=r_{form}=1.0$ m, has been chosen to be large enough so that the temperature at this radius does not significantly deviate from the virgin temperature $\Theta_{formation}^{virgin}(r_{form})$ of the earth formation 195.

Figure 3:
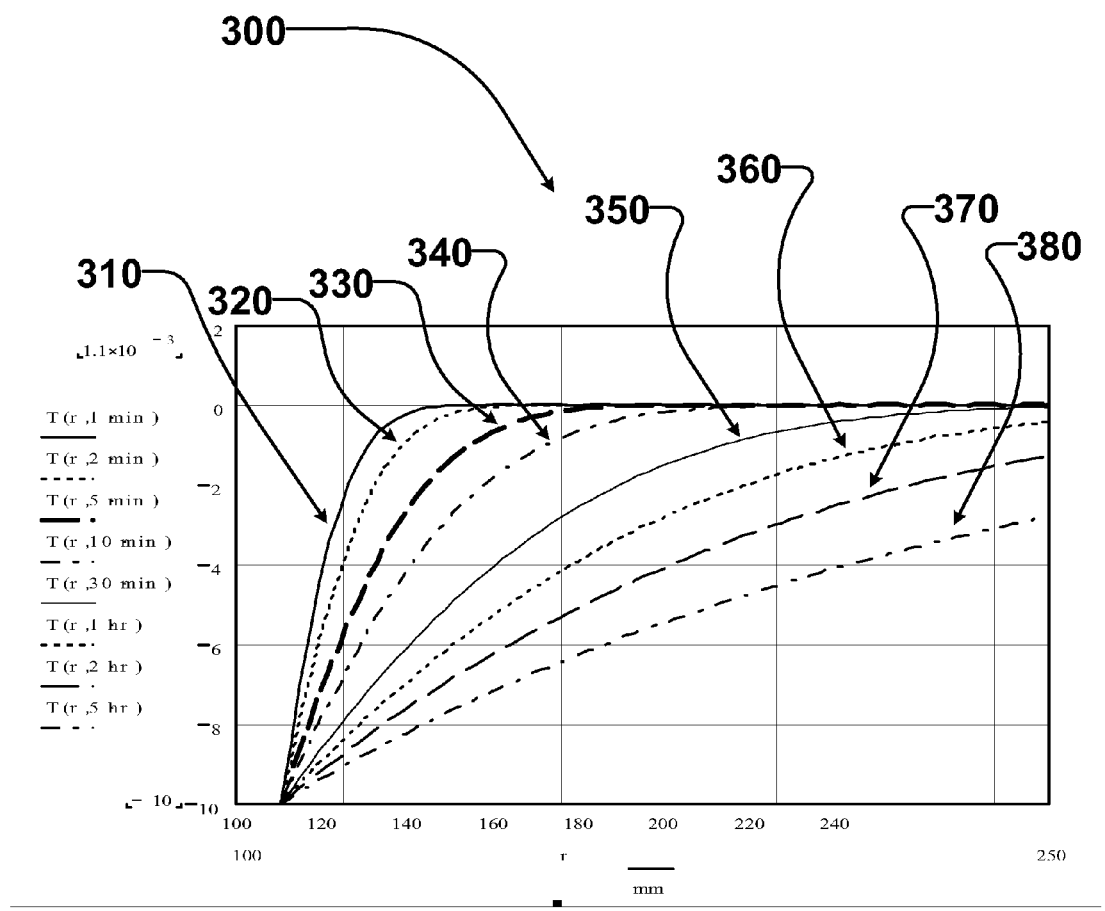
FIG. 3 schematically illustrates the temperature differences between the inside of the borehole wall and the earth formation near the borehole at a radial distance from the center of the borehole.

Eq. (21) may be solved by the PDE solver from Mathcad®, with results as shown at 300 in FIG. 3. As shown in FIG. 3, the specific heat capacity of the earth formation 195 is about $$c_{earth} = 800 \frac{J}{\text{kg } K},$$

the density of the earth formation 195 is about $$\rho_{earth} = 2300 \frac{\text{kg}}{\text{m}^3},$$

and the thermal conductivity of the earth formation 195 is about $$\lambda_{form} = 1.5 \frac{W}{m\,K}$$

(a typical value for weak sandstone). For t=1min, T(r,t=1 min) is as shown in curve 310, for t=2 min, T(r,t=2 min) is as shown in curve 320, for t=5 min, T(r,t=5 min) is as shown in curve 330, for t=10 min, T(r,t=10 min) is as shown in curve 340, for t=30 min, T(r,t=30 min) is as shown in curve 350, for t=1 hour, T(r,t=1 hour) is as shown in curve 360, for t=2 hours, T(r,t=2 hours) is as shown in curve 370, and for t=5 hours, T(r,t=5 hours) is as shown in curve 380. While in the foregoing illustrative example the Dirichlet boundary conditions are fixed temperatures, for the sake of simplicity, this is by no means a limitation. In general, one of the boundary conditions, namely, that the borehole wall temperature is approximately equal to the mud temperature, will be time-dependent.

Figure 4:
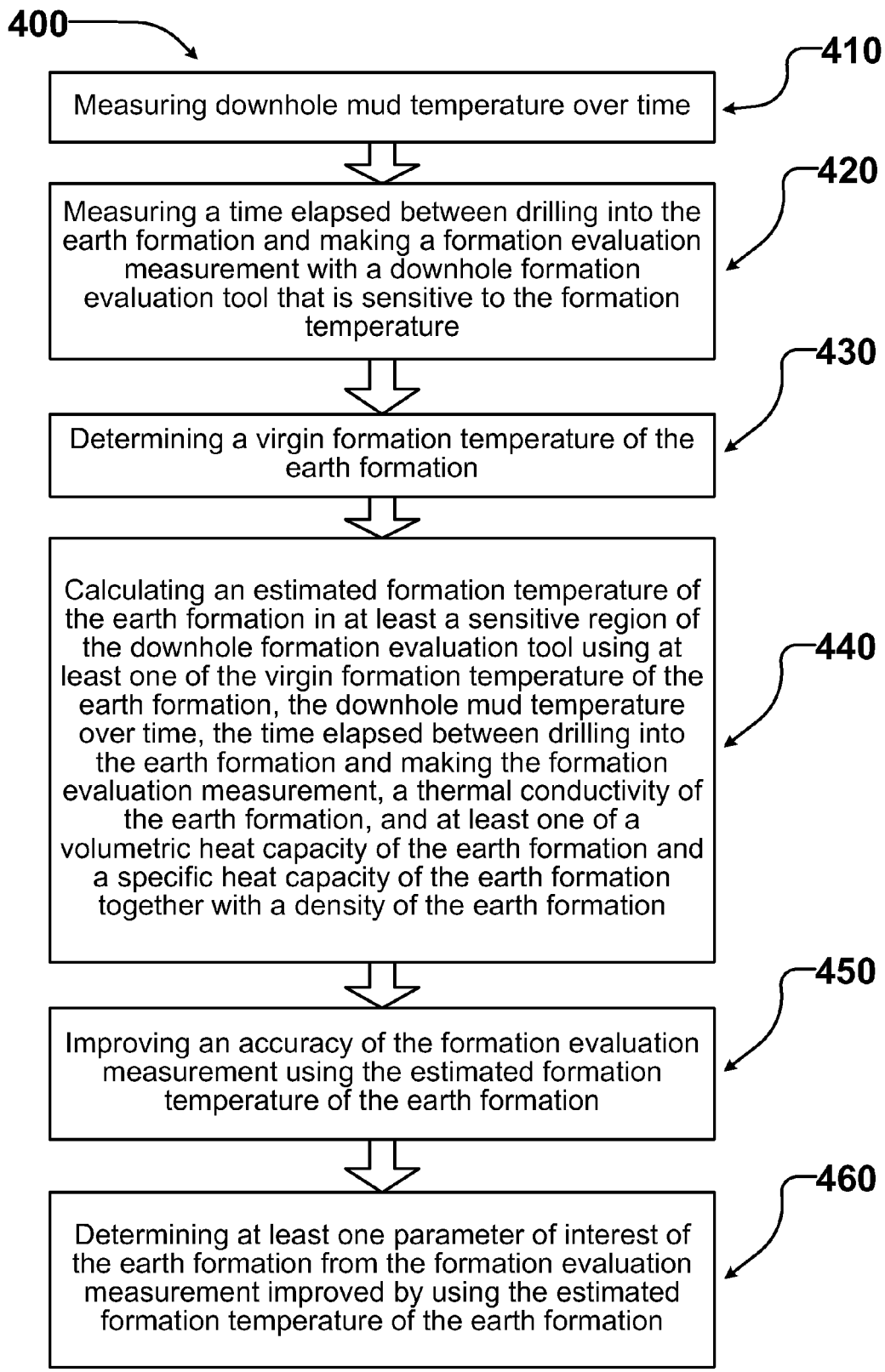
FIG. 4 schematically illustrates a method useful for evaluating an earth formation.

In accordance with the present disclosure, a device, a system, and a method useful for estimating or determining a formation temperature during drilling are disclosed. Such a temperature may be utilized in certain FE measurement techniques such as nuclear magnetic resonance (NMR) and/or Neutron Density (ND) measurement techniques. As shown in FIG. 4, a method 400 of determining a formation temperature in a region of an earth formation may be provided. The method 400 may include measuring downhole mud temperature over time, as indicated at 410. The method 400 may also include measuring a time elapsed between drilling into the earth formation and making a formation evaluation measurement with a downhole formation evaluation tool that is sensitive to the formation temperature, as indicated at 420. The method 400 may also include determining a virgin formation temperature of the earth formation, as indicated at 430. The method 400 may also include estimating a formation temperature of the earth formation in at least a selected region using the virgin formation temperature of the earth formation, the downhole mud temperature over time, the time elapsed between drilling into the earth formation and making the formation evaluation measurement, a thermal conductivity of the earth formation, and at least one of a volumetric heat capacity of the earth formation and a specific heat capacity of the earth formation together with a density of the earth formation, as indicated at 440. The method 400 may also include estimating a formation evaluation measurement using the estimated formation temperature of the earth formation, as indicated at 450. The method 400 may also include estimating at least one parameter of interest of the earth formation from the formation evaluation measurement corrected by using the estimated formation temperature of the earth formation, as indicated at 460.

The processing of the data may be accomplished by an information handling system, such as the surface control unit 140 or the downhole processor 177c. Measurements may also be stored on a suitable memory device and processed upon retrieval of the memory device. The processing may be done on site or at a remote location. Implicit in the control and processing of the data is the use of a computer program on a suitable machine-readable or computer-readable medium that enables the information handling system and/or the processor to perform the control or processing. The machine-readable or computer-readable medium may include instructions that enable the information handling system, such as the surface control unit and/or processor 140 and/or the downhole processor 177c, to evaluate the earth formation, such as by using the method 400. The machine-readable or computer-readable medium may include one or more of (i) a read-only memory (ROM), (ii) a programmable read-only memory (PROM), (iii) an electrically programmable read-only memory (EPROM), (iv) an electrically alterable read-only memory (EAROM), (v) an electrically erasable and programmable read-only memory (EEPROM), (vi) a flash memory, (vii) an optical disk, (viii) a hard drive, (ix) a non-volatile read-write memory and/or random access memory (NOVRAM and/or NVRAM), and the like.

Various illustrative embodiments have been described herein with examples of an MWD FE tool 179. The device, system, and method disclosed herein may be equally applicable to wireline applications in which the FE tool is conveyed on a wireline. For wireline applications, all or part of the processing may be done at the surface or at a remote location. For wireline applications, the formation evaluation (FE) tool is typically part of a downhole string of logging instruments.

The device, system, and method disclosed herein may be advantageous in providing a formation temperature $\Theta_{formation}$ in a sensitive volume or region of a downhole FE tool to be able to determine parameters of interest, such as an NMR (i) porosity value, (ii) clay bound water value, (iii) bound water irreducible value, (iv) bound water moveable value, (v) diffusivity value, and/or (vi) permeability value, and/or an ND neutron density value, for example, from the measured formation evaluation (FE) signals.

In one aspect, the present disclosure provides a method of estimating an actual formation temperature in a selected region of an earth formation penetrated by a borehole. A measurement is made of a property of interest of the earth formation in the selected region. A time difference or elapsed time is estimated between a time at which the borehole is drilled proximate the selected region and a time at which the measurement of the property of interest of the selected region is made. The temperature of a fluid in the borehole over time proximate the selected region is estimated as is a virgin formation temperature of the earth formation corresponding to the selected region. An estimation of a thermal conductivity of the earth formation and a heat capacity of the earth formation is used. The actual temperature of the selected region is estimated using the estimated elapsed time, temperature of the fluid measured over time, virgin formation temperature, a thermal conductivity of the earth formation, and a heat capacity of the earth formation. The heat capacity of the earth formation may be one of (i) a volumetric heat capacity of the earth formation, and (ii) a specific heat capacity of the earth formation together with a density of the earth formation to calculate the formation temperature in the region. The estimated actual temperature of the selected region may be used to process the measurement of the property of the selected region to estimate a parameter of interest of the selected region.

The virgin formation temperature may be estimated using a temperature measurement made in a secondary borehole that is spaced apart from the borehole. The temperature of the fluid may be measured at a time that is one of: (i) after stopping flow of the fluid into the borehole for at least a first predetermined period of time, and (ii) substantially immediately after starting flow of the fluid after at least a second predetermined period of time without fluid flow. Wherein the selected region is at a first depth, the method further includes estimating a virgin formation temperature at a second depth using the estimated temperature of the selected region at the first depth and a geological temperature gradient of the earth formation. The actual formation temperature of the selected region may be estimated by solving at least one partial differential equation. The estimated parameter of interest of the earth formation typically includes at least one of: (i) an Nuclear Magnetic Resonance (NMR) porosity value, (ii) an NMR clay bound water value, (iii) an NMR bound water irreducible value, (iv) an NMR bound water moveable value, (v) an NMR diffusivity value, (vi) an NMR permeability value of the earth formation, and (vii) a neutron density (ND) value.

In another aspect, the present disclosure provides an apparatus for estimating a property of interest of a selected region of a formation penetrated by a borehole. The apparatus includes a tool having: (i) a sensor configured to provide a measurement of a property of interest of the selected region; and (ii) a processor configured to estimate an actual formation temperature utilizing: (a) a virgin formation temperature of the earth formation; (b) a temperature of a fluid in the borehole over time proximate the selected region; (c) a time elapsed (difference) between time the borehole is drilled proximate the selected region and time at which a measurement of the property of interest of the selected region is made; (d) an estimate of a thermal conductivity of the earth formation; and (e) an estimate of a heat capacity of the earth formation. The heat capacity of the earth formation may be one of (i) a volumetric heat capacity of the earth formation, and (ii) a specific heat capacity of the earth formation together with a density of the earth formation. The processor may be further configured to use the estimated actual temperature of the selected region to process the measurement of the property of interest in the selected region to estimate the parameter of interest of the selected region.

In one aspect, the apparatus further includes a sensor for measuring the temperature of the earth formation. The processor may further be configured to determine the temperature of the fluid at a time that is one of: (i) after stopping flow of the fluid into the borehole for at least a first predetermined period of time, and (ii) substantially immediately after starting flow of the fluid after at least a second predetermined period of time without fluid flow.

The selected region may be at a first depth, typically chosen so as to obtain a clear title to the land. The apparatus may be further configured to estimate a virgin formation temperature at a second depth using the estimated temperature of the selected region at the first depth and a geological temperature gradient of the earth formation. The processor may be further configured to estimate the actual formation temperature of the selected region by solving at least one partial differential equation. The property of interest is typically one of: (i) an NMR porosity value, (ii) an NMR clay bound water value, (iii) an NMR bound water irreducible value, (iv) an NMR bound water moveable value, (v) an NMR diffusivity value, and (vi) permeability value of the earth formation, and/or an ND neutron density value.

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in an appropriate set of claims. It is therefore evident that the particular illustrative embodiments disclosed above may be altered or modified and all such variations are considered within the scope and spirit of the present disclosure.

What is claimed is:

1. A method of estimating an actual temperature of a selected region of an earth formation penetrated by a borehole, comprising:
   using a sensor to make a measurement relating to a property of interest of the selected region of the earth formation;
   using a sensor to measure a temperature of a mud in the borehole over time proximate the selected region;
   estimating a virgin formation temperature of the selected region;
   estimating a thermal conductivity of the earth formation;
   estimating a heat capacity of the earth formation; and
   using a processor to:
      estimate a time difference ("elapsed time") between a time the borehole is drilled proximate the selected region and a time at which the measurement relating to the property of interest of the selected region is made, and
      estimate the actual temperature of the selected region at the elapsed time using the estimated elapsed time, temperature of the mud measured over time, virgin formation temperature, thermal conductivity of the earth formation, and heat capacity of the earth formation.

2. The method of claim 1, wherein estimating the virgin formation temperature comprises using a temperature measurement made in a secondary borehole that is spaced apart from the borehole penetrating proximate the selected region.

3. The method of claim 1 further comprising estimating a virgin formation temperature of the formation at a borehole depth spaced from the selected region using the estimated actual temperature of the selected region and a geological temperature gradient of the earth formation.

4. The method of claim 1 further comprising estimating the actual formation temperature of the selected region by solving at least one partial differential equation.

5. The method of claim 1 further comprising using the estimated actual temperature of the selected region to process the measurement to estimate the property of interest of the selected region.

6. The method of claim 5 wherein the property of interest is one of: (i) an Nuclear Magnetic Resonance (NMR) porosity; (ii) an NMR clay bound water value; (iii) an NMR bound water irreducible value; (iv) an NMR bound water moveable value; (v) an NMR diffusivity value; (vi) an NMR permeability value; and (vii) a neutron density (ND) value.

7. The method of claim 1, wherein the heat capacity is a volumetric heat capacity of the earth formation.

8. The method of claim 7, wherein the volumetric heat capacity is based on a specific heat capacity and a density of the formation.

9. An apparatus for use in a borehole, comprising:
   a sensor configured to provide a measurement relating to a property of interest of a selected region proximate a borehole; and
   a sensor configured to measure a temperature of a mud in the borehole over time proximate the selected region; and
   a processor configured to:
      estimate a time difference ("elapsed time") between a time the borehole is drilled proximate the selected region and a time at which the measurement relating to the property of interest of the selected region is made; and
      estimate an actual temperature of the selected region of the formation at the elapsed time using the estimated time difference, the measured temperature of the mud in the borehole over time, a virgin formation temperature of the earth formation; an estimated thermal conductivity of the earth formation, and an estimated heat capacity of the earth formation.

10. The apparatus of claim 9, wherein the processor is further configured to estimate the property of interest of the selected region using the estimated actual temperature of the region and the measurement relating to the property of interest.

11. The apparatus of claim 9, wherein the property of interest is one of: (i) an NMR porosity; (ii) an NMR clay bound water value;
   (iii) an NMR bound water irreducible value; (iv) an NMR bound water moveable value; (v) an NMR diffusivity value; and (vi) permeability of the earth formation; and (vii) a neutron density.

12. The apparatus of claim 9 further comprising a data storage device accessible to the processor that has stored therein the thermal conductivity of the earth formation and heat capacity of the earth formation.

13. The apparatus of claim 9, wherein the processor is further configured to compute the elapsed time and the actual temperature of the formation during drilling of the borehole.

14. The apparatus of claim 4, wherein the volumetric heat capacity of the earth formation is based on a specific heat capacity and density of the formation.

15. The apparatus of claim 9, wherein the virgin formation temperature is obtained using a temperature measurement made in a secondary borehole that is spaced apart from the borehole drilled proximate the selected region.

16. The apparatus of claim 9 further comprising a sensor for measuring the temperature of the mud in the borehole over time.

17. The apparatus of claim 9, wherein the processor is further configured to estimate the actual formation temperature of the selected region by solving at least one partial differential equation.

18. The apparatus of claim 9, wherein the heat capacity of the earth formation is a volumetric heat capacity of the earth formation.

19. The apparatus of claim 18, wherein the processor is further configured to estimate a virgin formation temperature at a depth downhole of the selected region using a geological temperature gradient of the earth formation.

* * * * *